(12) United States Patent
Tseng et al.

(10) Patent No.: US 7,532,182 B2
(45) Date of Patent: May 12, 2009

(54) IMAGE DISPLAY WITH PHOTO SENSOR

(75) Inventors: Huai-Yuan Tseng, Pingzhen (TW);
Bou-Chi Chang, Hsinchu (TW);
Yung-Hui Yeh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 830 days.

(21) Appl. No.: 11/138,286

(22) Filed: May 27, 2005

(65) Prior Publication Data

US 2006/0214893 A1   Sep. 28, 2006

(30) Foreign Application Priority Data

Mar. 28, 2005   (TW) .............................. 94109602 A

(51) Int. Cl.
*G09G 3/32* (2006.01)

(52) U.S. Cl. .......................................... 345/82; 345/156

(58) Field of Classification Search .................. 345/82, 345/76, 156, 173, 207; 315/169.1, 169.3, 315/169.4; 348/602, 800, 801, 813; 178/18.01
See application file for complete search history.

(56) References Cited

U.S. PATENT DOCUMENTS

| 6,720,942 | B2 | 4/2004 | Lee et al. ....................... 345/82 |
| 6,738,031 | B2 * | 5/2004 | Young et al. ................... 345/55 |
| 7,046,240 | B2 * | 5/2006 | Kimura ....................... 345/212 |
| 7,053,875 | B2 * | 5/2006 | Chou .......................... 345/92 |
| 7,285,900 | B2 * | 10/2007 | Yang et al. ................... 313/495 |

\* cited by examiner

*Primary Examiner*—Abbas I Abdulselam
(74) *Attorney, Agent, or Firm*—WPAT, P.C.; Justin King

(57) ABSTRACT

The present invention discloses an image display with photo sensor, electrically connected to a data line, a first scan line, a second scan line and a sensing line, and being powered by a first bias voltage and a second bias voltage, comprising a light emitting element, a first transistor, a second transistor, a third transistor, a photo sensor and a capacitor, which is featuring by arranging photo sensors in the proximity of light emitting elements so as to enable the image display with photo sensor to act as an output device for displaying images and also as an input device for detecting light.

4 Claims, 5 Drawing Sheets

IMAGE DISPLAY WITH PHOTO SENSOR

FIELD OF THE INVENTION

The present invention relates to an image display, and more particularly, to an image display with photo sensor capable of performing an operation of light detection.

BACKGROUND OF THE INVENTION

As the rapid advance of technology propelling the development of electronic related industry, electronic products had become more and more intimate to our daily life, which is especially true to computers. No matter it is a desktop computer, or is a notebook computer, both require to use displays for showing information to users thereof. Hence, without notice, displays have become the electronic products that are used almost all the time in our modern life.

As displays have becoming more and more closely related to our lives, the electronic related industry feels the need of optimizing the performance of displays so as to provide a more competitive and user-friendly electronic product to the consumers.

Although the recent rapid development of image display technology had enabled the same to be applied to many state-of-the-art applications, nevertheless, the displays used in all those applications are still being used for displaying images. In a future display panel, not only has a fully integrated driving circuit, but also should multi-functional, i.e. it not only can act as an output device for displaying images, but also as an input device.

As seen in FIG. 1A and FIG. 1B, a common touch panel 7 is formed by superimposing two transparent electrode layers 71, 72 on an emitting layer 70, wherein the two transparent electrode layers 71, 72 are separated by a plurality of spacer 73 while the alignment of transparent electrode layer 71 is perpendicular to that of the transparent electrode layer 72, and the transparent electrode layers 71 has a specific electric polarity while the transparent electrode layer 72 has a different electric polarity opposite to that of the transparent electrode layer 71. When the touch panel is pressed, the portion of the two transparent electrode layers 71, 72 under the pressed portion 710 are engaged with each other and thus electric signals are generated, just like a turning on a switch. However, the shortcomings of the abovementioned conventional touch panel 7 are as following:

(1) The performance of the conventional touch panel is dependent on the material of the two transparent electrode layers since on/off operation is activated by the engagement of the two electrode layers.
(2) Affected by the strength of the transparent electrode layer, the transparent electrode layer can be bended by repetitive pressing which might adversely affected the operation of the touch panel.
(3) Since the requirement of superimposing the transparent electrode layers on the emitting layer, the brightness and the visibility of the touch panel are decrease.

Attempts have been made in the prior art to overcome the problems noted above. For example, U.S. Pat. No. 6,720,942 issued Apr. 13, 2004 to Eastman Kodak Company, entitled "Flat-Panel Light Emitting Pixel With Luminance Feedback", describes an image display includes an addressable image display pixel, comprising: a substrate; a light emitter formed on the substrate; and a photo-sensor formed on the substrate and optically coupled to the light emitter to detect light emitted by the light emitter to generate a feedback voltage signal in response to light emitted by the light emitter.

Although the foregoing image display can issue signals without the mechanical engagement required in the abovementioned conventional touch panel, each pixel circuit of the referring image display will require as more as five transistors, consequently that the complexity of the circuit layout will cause high manufacturing cost and thus is not feasible for mass production.

Therefore, there is a need for a low-cost image display with photo sensor which can be produced by a simple manufacturing process.

SUMMARY OF THE INVENTION

It is the primary object of the invention to provide an image display with photo sensor composed of a plurality of pixels, which is featuring by arranging a photo sensor in the proximity of a light emitting element in each pixel thereof so as to enable the image display with photo sensor to act as an output device for displaying images and also as an input device for detecting light.

It is another object of the invention to provide an image display with photo sensor, which can avoid the requirement of forming pressure sensing electrode layers over light emitting elements by arranging photo sensors on the same surface with light emitting elements so as to prevent the image display to be damaged by touching while performing input operation thereby and the same time to enhance the brightness and visibility of the image display.

It is yet another object of the invention to provide an image display with photo sensor, in which each pixel is driven and controlled by only three transistors so that the circuit layout thereof is simplified and thus the manufacturing cost thereof can be reduced.

To achieve the above objects, the present invention provides an image display with photo sensor composed of a plurality of pixels, electrically connected to a data line, a first scan line, a second scan line and a sensing line, and being powered by a first bias voltage and a second bias voltage, each pixel comprising:

a light emitting element, for emitting light;
a first transistor, further comprising: a first gate, electrically connected to the first scan line; and a first drain/source, having a first electrode electrically connected to the data line and a second electrode;
a second transistor, further comprising: a second gate, electrically connected to the second electrode of the first drain/source; and a second drain/source, having a third electrode electrically connected to the first bias voltage and a fourth electrode electrically connected to the light emitting element in a forward bias manner;
a third transistor, further comprising a third gate, electrically connected to the second scan line; and a third drain/source, having a fifth electrode electrically connected to sensing line and a sixth electrode;
a photo sensor, have two terminals, one of the two terminals being electrically connected the six electrode of the third drain/source while another terminal being electrically connected to the second bias voltage in a reverse bias manner; and
a capacitor, having two terminals, one of the two terminals being electrically connected to the first bias voltage while another terminal being electrically connected to the second gate and the second electrode of the first drain/source.

In a preferred embodiment, the present invention provides an image display with photo sensor composed of a plurality of pixels, each pixel being electrically connected to a data line, a first scan line, a second scan line and a sensing line, and being powered by a first bias voltage, a second bias voltage and a third bias voltage, each pixel comprising:

a light emitting element, for emitting light;

a first transistor, further comprising: a first gate, electrically connected to the first scan line; and a first drain/source, having a first electrode electrically connected to the data line and a second electrode;

a second transistor, further comprising: a second gate, electrically connected to the second electrode of the first drain/source; and a second drain/source, having a third electrode electrically connected to the first bias voltage and a fourth electrode electrically connected to the light emitting element in a forward bias manner;

a third transistor, further comprising a third gate, electrically connected to the second scan line; and a third drain/source, having a fifth electrode electrically connected to data line and a sixth electrode;

a fourth transistor, further comprising a fourth gate; and a fourth drain/source, having a seventh electrode electrically connected to sensing line and an eighth electrode electrically connected to the third bias voltage;

a photo sensor, have two terminals, one of the two terminals being electrically connected the second bias voltage in a reverse bias manner while another terminal being electrically connected to the fourth gate and the sixth electrode of the third drain/source; and a capacitor, having two terminals, one of the two terminals being electrically connected to the first bias voltage while another terminal being electrically connected to the second gate and the second electrode of the first drain/source.

Preferably, the light emitting element is a device selected from the group consisting of an Organic Light Emitting Diode (OLED), a Polymer Light Emitting Diode (PLED), and a Carbon Nanotube Field Emission Display (CNT-FED).

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1A:
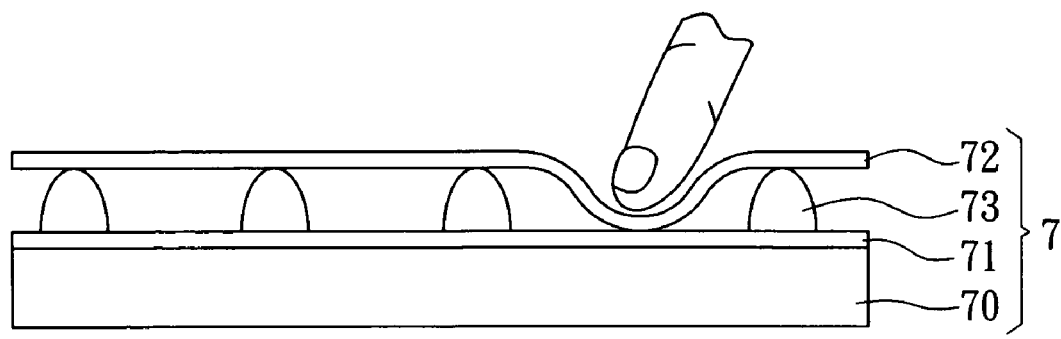
FIG. 1A is a schematic side view of a conventional touch panel.
Figure 1B:
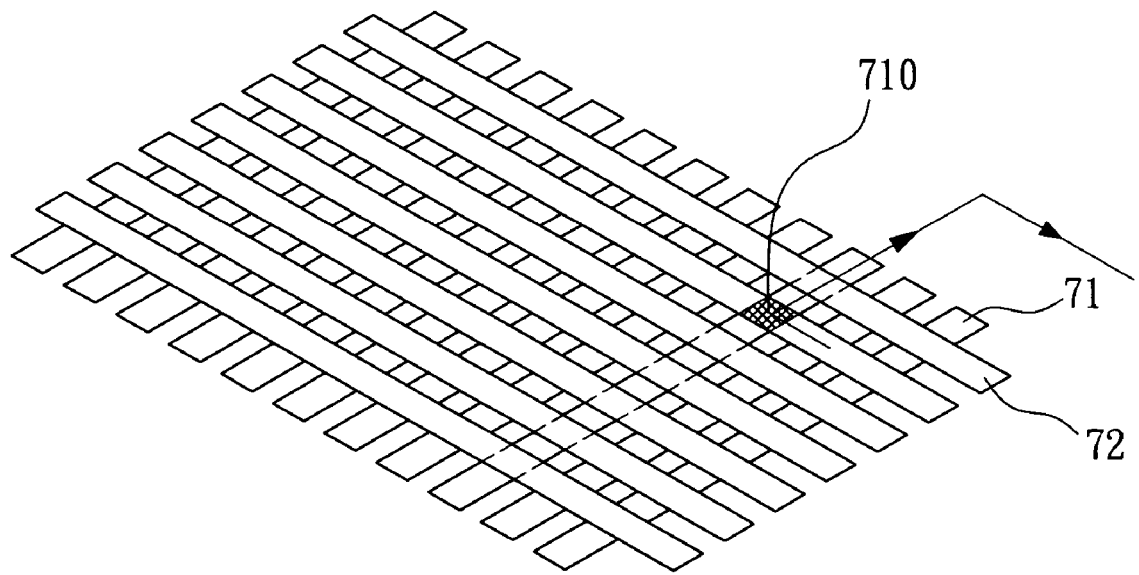
FIG. 1B is a schematic top view of a conventional touch panel.
Figure 2A:
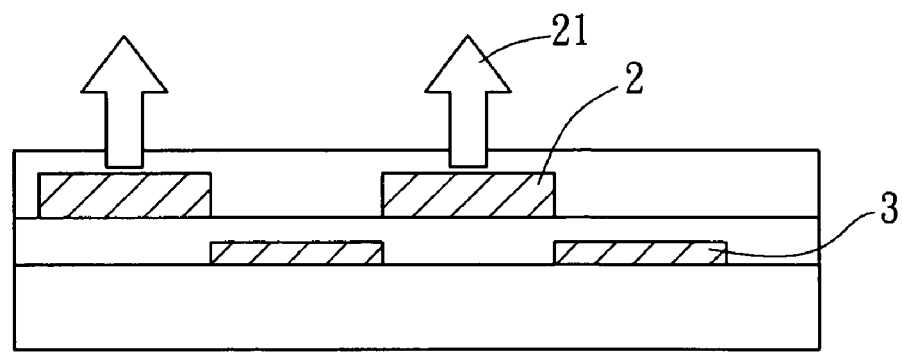
FIGS. 2A, 2B and 2C are schematic illustrations showing the applications of an image display with photo sensor according to a preferred embodiment of the invention.
Figure 2B:
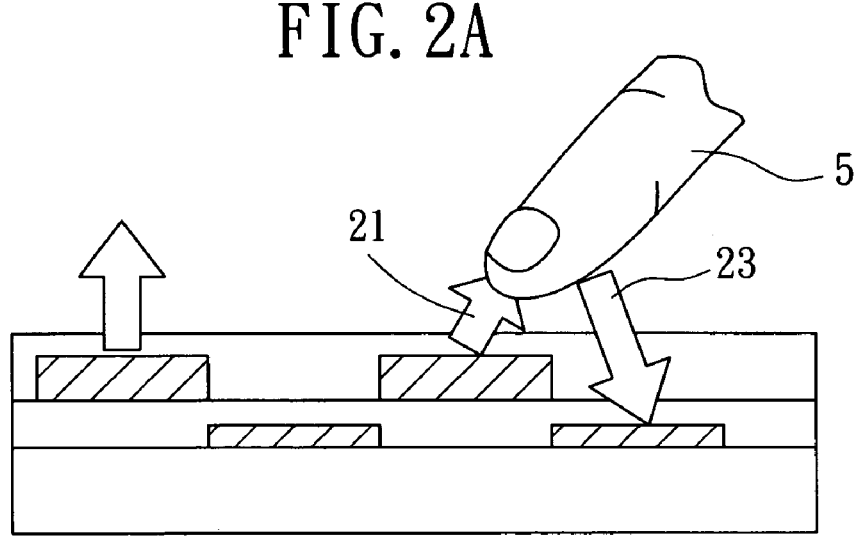
Figure 2C:
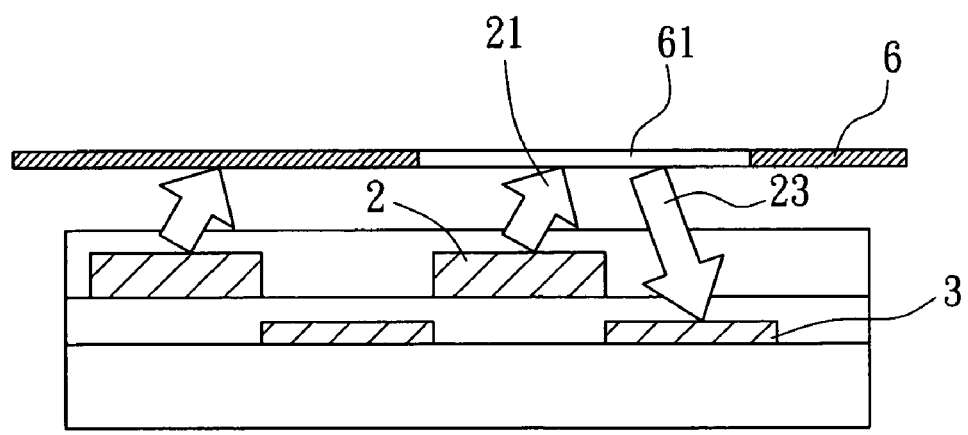

Please refer to FIGS. 2A, 2B and 2C, which are schematic illustrations showing the applications of an image display with photo sensor according to a preferred embodiment of the invention. Each pixel of the image display of the invention comprises: a light emitting element 2 for radiating light 21; and a photo-sensor 3, capable of detecting the strength of the reflected light 23 reflected by an object-under-scan or by an input operation of an user 5 to generate a signal representing the input of the user 5 or the pattern 61 of the object-under-scan in response to light 21 emitted by the light emitting element 2.

Figure 3:
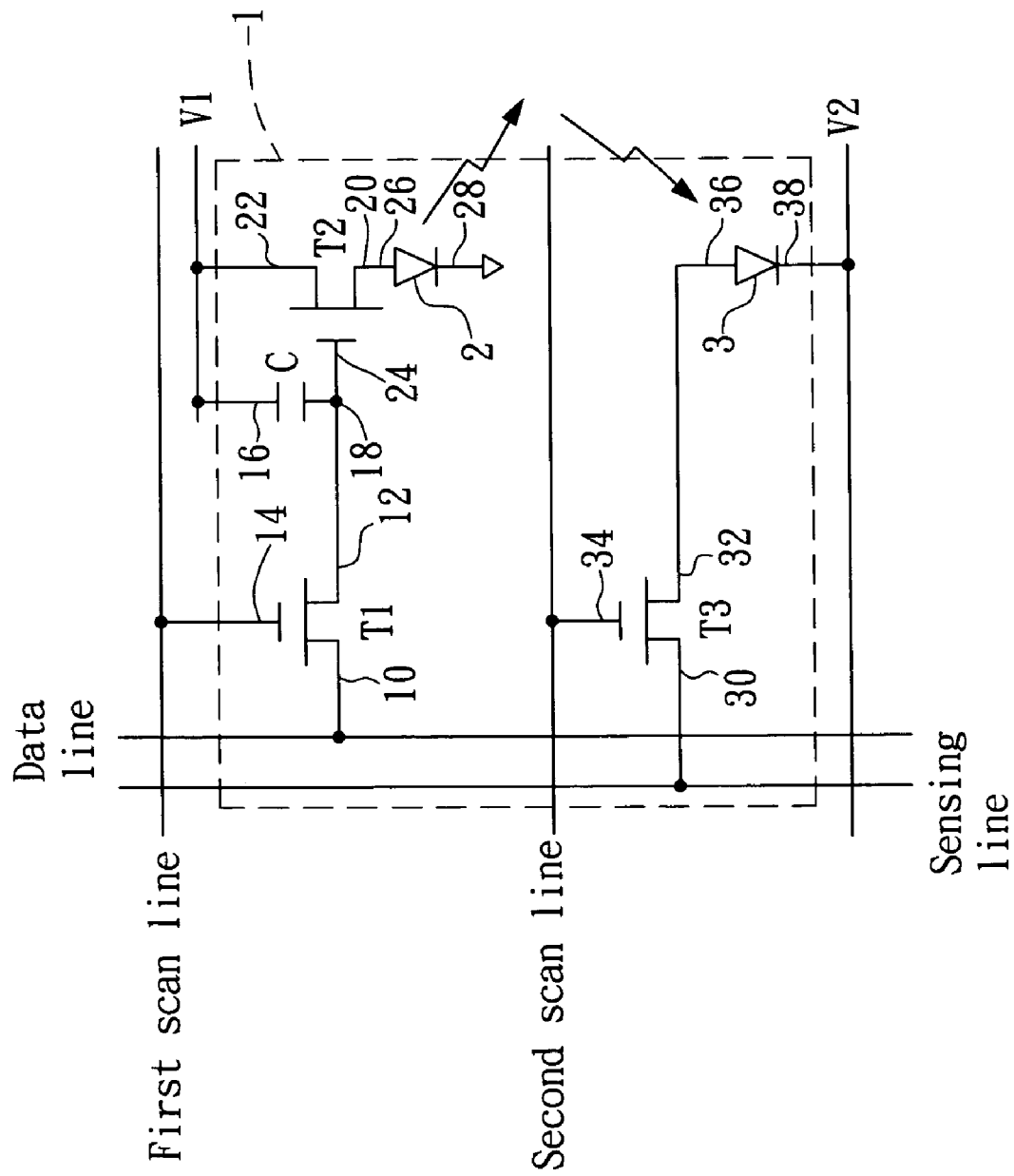
FIG. 3 is a schematic view of a circuit layout of an image display with photo sensor according to a first embodiment of the invention.

In FIG. 3, each pixel 1 of the image display with photo sensor of the invention is electrically connected to a data line, a first scan line, a second scan line and a sensing line, and is powered by a first bias voltage V1, a second bias voltage V2, wherein the data line is electrically connected to a data driver, the scan lines are electrically connected to a scan driver and the sensing line is electrically connected to a processor.

As seen in FIG. 3, each pixel 1 of the image display with photo sensor comprises three transistors T1, T2, T3, a capacitor C, a light emitting element 2 and a photo sensor 3. The light emitting element 2 is capable of emitting light and the photo sensor 3 is capable of detecting and receiving light for generating current correspondingly. The transistor T1 further comprises: a first gate 14, electrically connected to the first scan line; and a first drain/source, having a first electrode 10 electrically connected to the data line and a second electrode 12. The transistor T2 further comprises: a second gate 24, electrically connected to the second electrode 12 of the first drain/source; and a second drain/source, having a third electrode 22 electrically connected to the first bias voltage V1 and a fourth electrode 20 electrically connected to a P-type electrode of the light emitting element 2 in a forward bias manner while a N-type electrode of light emitting element 2 is grounded. The transistor T3 further comprises: a third gate 34, electrically connected to the second scan line; and a third drain/source, having a fifth electrode 30 electrically connected to the sensing line and a sixth electrode 32. The photo sensor 3 further comprises: a P-type electrode 36, electrically connected to the six electrode 32 of the third drain/source, and a N-type electrode, electrically connected to the second bias voltage V2 in a reverse bias manner. The capacitor C has two terminals, one terminal 16 of the two terminals being electrically connected to the first bias voltage V1 while another terminal 18 being electrically connected to the second gate 24 and the second electrode 12 of the first drain/source.

While an array of the plural pixels 1 as abovementioned is configured in a matrix of various shape and size, the image display with photo sensor is used as a device for displaying images. As the image display with photo sensor is used for displaying images, the light emitting element 2 is radiating light continuously and thus the photo sensor 3 is subject to the radiation of the emitting element 2 all the time such that the photo sensor 3 is constantly activated, i.e. the photo sensor 3 is continuously converting the light received thereby into current. As the first scan line and the second scan line are activated in sequence, the current generated by the photo sensor 3 is fed to the processor through the transistor T3 and then the sensing line where the current is transformed into signals which are discarded.

As the image display with photo sensor is used as a touch screen or a scanner and an object-under-scan like a finger or a document is placed thereon, first, all the light emitting elements are enabled to emit light of the same wave length range so that the current generated by the photo sensor 3 is in tune to each other for resetting, and then the array of light emitting elements are enabled to emit light successively while activating the corresponding first scan lines successively such that the photo sensor 3 corresponding to the activated light emitting element 2 will detect a light reflected by the object-under-scan and converting the reflected light into current. As the corresponding second scan line is activated, the current generated by the photo sensor 3 is fed to the processor through the transistor T3 and then the sensing line where the current is transformed into signals by which the pattern of the object-under-scan can be acquired.

Figure 4:
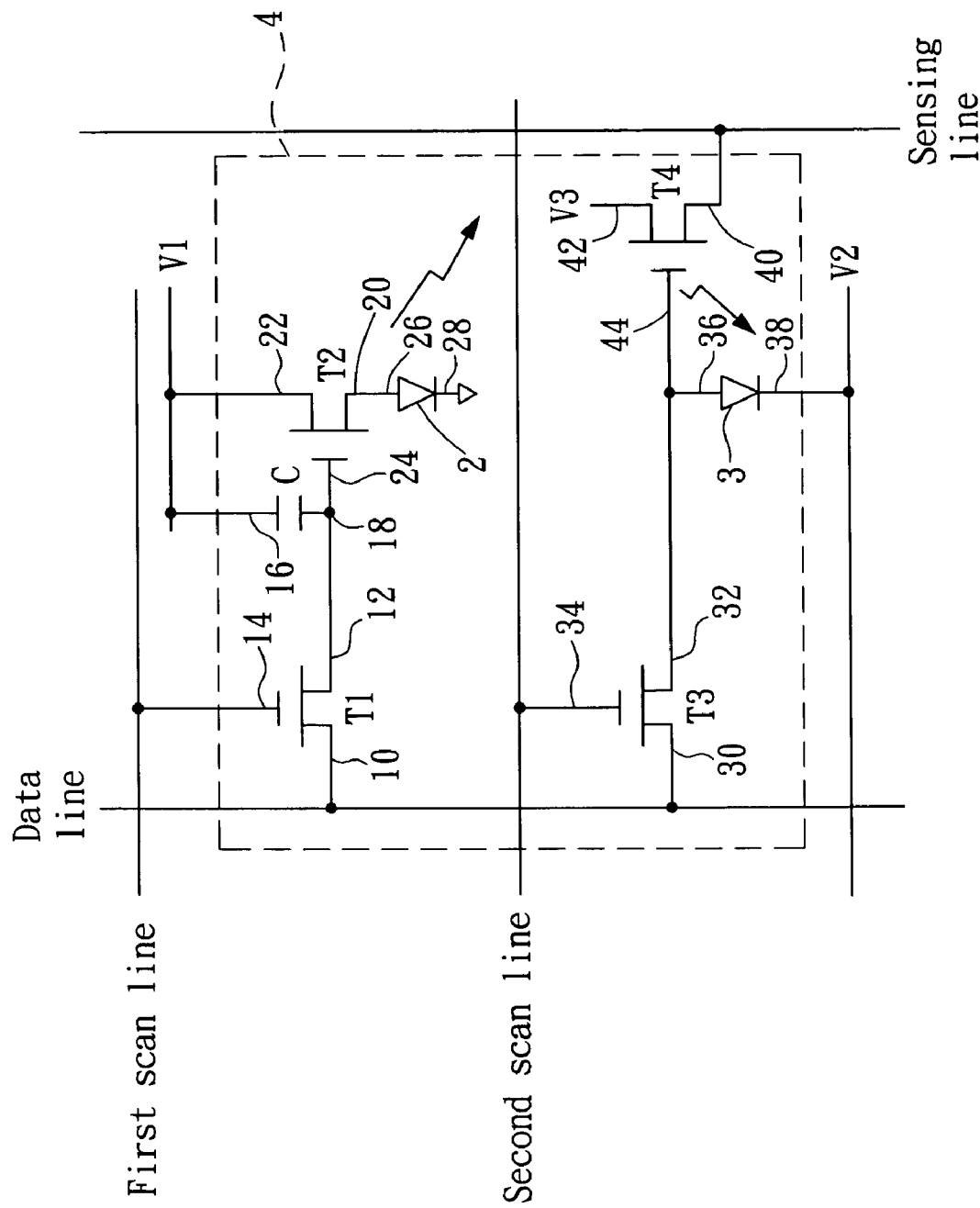
FIG. 4 is a schematic view of a circuit layout of an image display with photo sensor according to a second embodiment of the invention.

In FIG. 4, an additional transistor T4 is added where the transistor T4 further comprising a fourth gate 44; and a fourth drain/source, having a seventh electrode 40 electrically connected to the sensing line and an eighth electrode 42 electrically connected to a third bias voltage V3 while the gate 34 of the transistor T3 is electrically connected to the second scan line, the fifth electrode 30 of the third drain/source is electrically connected to the data line and the sixth electrode 32 is electrically connected to the fourth gate 44 of the transistor T4. Moreover, The P-type electrode 36 of the photo sensor 3 is electrically connected to the six electrode 32 of the third drain/source and the fourth gate 44, and the N-type electrode of the photo sensor 3 is electrically connected to the second bias voltage V2 in a reverse bias manner.

While an array of the plural pixels 4 of FIG. 4 as above-mentioned is configured in a matrix of various shape and size, the image display with photo sensor is used as a device for displaying images. As the image display with photo sensor is used for displaying images, the light emitting element 2 is radiating light continuously and thus the photo sensor 3 is subject to the radiation of the emitting element 2 all the time such that the photo sensor 3 is constantly activated, i.e. the photo sensor 3 is continuously converting the light received thereby into current which activates the transistor T4. As the transistor T4 is activated, the current caused by the third bias voltage V3 is fed to the processor through the transistor T4 and then the sensing line where the current is transformed into signals which are discarded.

As the image display with photo sensor is used as a touch screen or a scanner and an object-under-scan like a finger or a document is placed thereon, first, all the light emitting elements are enabled to emit light of the same wave length range so that the current generated by the photo sensor 3 is in tune to each other for resetting. The difference between the configuration of FIG. 4 and the configuration of FIG. 3 is that, with the installment of the additional transistor T4, the channel of the transistor T4 is activated as soon as the photo sensor 3 detects the reflected light so as to enable the current caused by the third bias voltage V3 to be transmitted from the sensing line. In the preferred embodiment of FIG. 4, a frame is scanned with only one light emitting element 2 is activated, that is, only the scan line of one light emitting element 2 is fed with activating signal while the scan lines of the other light emitting elements 2 are fed with deactivating signals. As the first scan line of a light emitting element 2 is activated enabling the same to emitting light, the photo sensor 3 will receive reflected light and thus enable the channel of the transistor T4 to be activated so that the current caused by the third bias voltage V3 can be transmitted from the sensing line to the process where are being converted into signals and used for acquiring the pattern of the object-under-scan. Thereafter, as the second scan line is activated, the channel of the transistor T3 is activated, and the same time that a reset signal is transmitted from the data line to the transistor T4 for deactivating the channel of the transistor T4 and stopping the current from flowing into the sensing line (i.e. for resetting the transistor T4).

Figure 5:
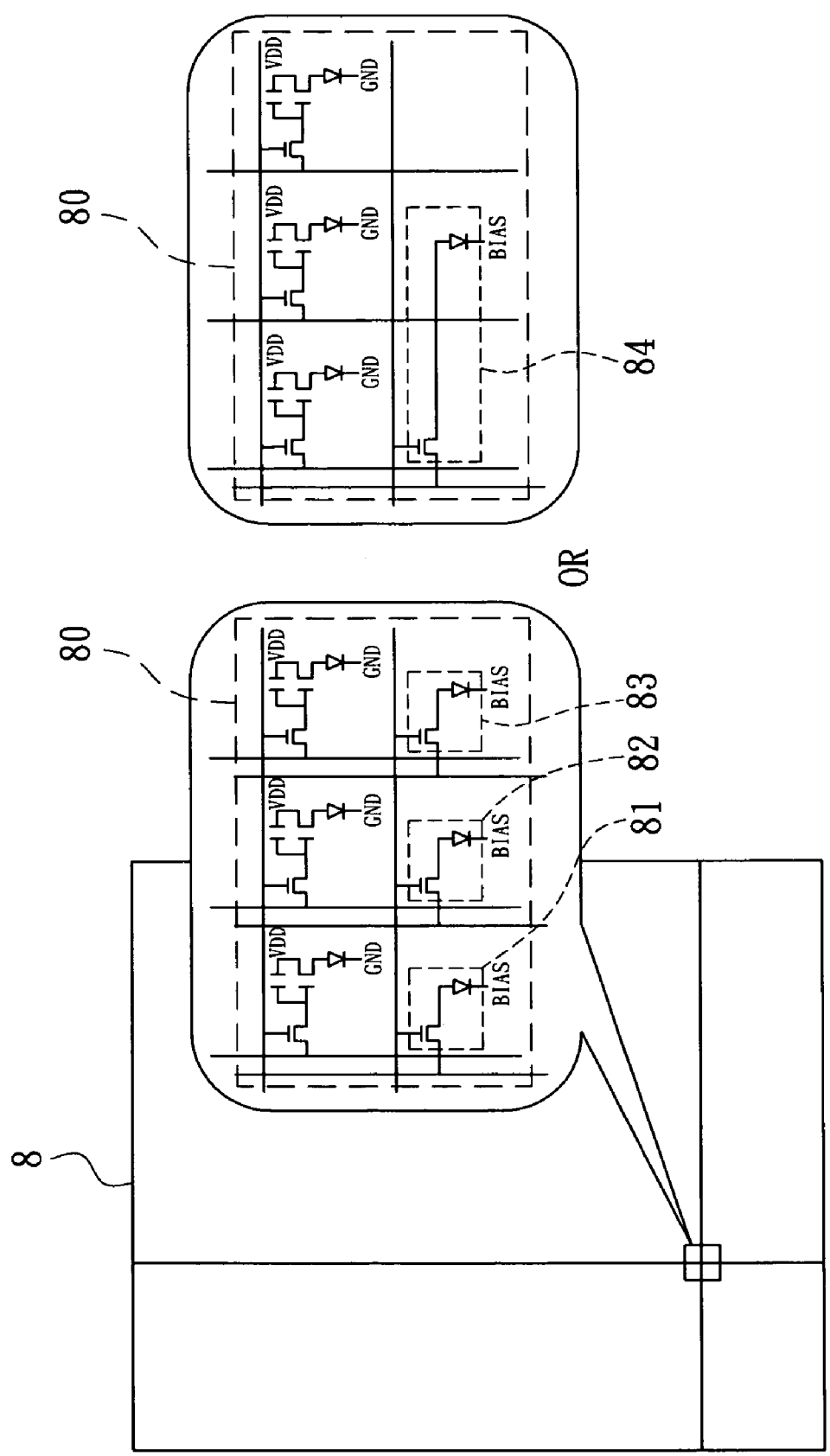
FIG. 5 is an enlarged view of an image display with photo sensor according to a preferred embodiment of the invention.

Please refer to FIG. 5, which is an enlarged view of an image display with photo sensor according to a preferred embodiment of the invention. The panel 8 is the configuration of an array of a plural of pixels 80 of the invention in a matrix of various shape and size. As the panel is used in a scanner which demands to detect colors with high precision, a plurality of photo sensors can be integrated in one pixel 80 for enabling the pixel to detect light of different wavelength ranges. In a preferred embodiment, there photo sensors 81, 82, 83 are used for detecting red light, green light, and blue light in respective. On the other hand, as the panel is used as a touch screen which is less demanding in color detection, a single photo sensor 84 is sufficient and thus is more cost efficient.

It is noted that the light emitting element can be a device selected from the group consisting of an Organic Light Emitting Diode (OLED), a Polymer Light Emitting Diode (PLED), and a Carbon Nanotube Field Emission Display (CNT-FED).

Therefore, the image display with photo sensor of the invention is a multi-function device capable of displaying images and detecting light, which has prefer visibility and brightness since it can operate without the requirement to install electrode layers for pressure sensing while the cost of manufacturing the image display is reduce since the elements required is reduced and the circuit layout is simplified.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An image display with photo sensor composed of a plurality of pixels, each pixel being electrically connected to a data line, a first scan line, a second scan line and a sensing line, and being powered by a first bias voltage, a second bias voltage and a third bias voltage, comprising:

a light emitting element;

a first transistor, further comprising: a first gate, electrically connected to the first scan line; and a first drain/source, having a first electrode electrically connected to the data line and a second electrode;

a second transistor, further comprising: a second gate, electrically connected to the second electrode of the first drain/source; and a second drain/source, having a third electrode electrically connected to the first bias voltage and a fourth electrode electrically connected to the light emitting element in a forward bias manner;

a third transistor, further comprising a third gate, electrically connected to the second scan line; and a third drain/source, having a fifth electrode electrically connected to the data line and a sixth electrode;

a fourth transistor, further comprising a fourth gate; and a fourth drain/source, having a seventh electrode electrically connected to the sensing line and an eighth electrode electrically connected to the third bias voltage;

a photo sensor, have two terminals, one of the two terminals being electrically connected the second bias voltage in a reverse bias manner while another terminal being electrically connected to the fourth gate and the sixth electrode of the third drain/source; and a capacitor, having two terminals, one of the two terminals being electrically connected to the first bias voltage while another terminal being electrically connected to the second gate and the second electrode of the first drain/source.

2. The image display of claim 1, wherein the light emitting element is an Organic Light Emitting Diode (OLED).

3. The image display of claim 1, wherein the light emitting element is a Polymer Light Emitting Diode (PLED).

4. The image display of claim 1, wherein the light emitting element is a Carbon Nanotube Field Emission Display (CNT-FED).

* * * * *